(12) United States Patent
Cilingir et al.

(10) Patent No.: US 10,225,643 B1
(45) Date of Patent: Mar. 5, 2019

(54) SECURE AUDIO ACQUISITION SYSTEM WITH LIMITED FREQUENCY RANGE FOR PRIVACY

(71) Applicant: Intel Corporation, Santa Clara, CA (US)

(72) Inventors: Gokcen Cilingir, San Jose, CA (US); David Pearce, El Dorado Hills, CA (US); Adam Kupryjanow, Gdansk (PL); Suhel Jaber, San Jose, CA (US); Paulo Lopez Meyer, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/843,930

(22) Filed: Dec. 15, 2017

(51) Int. Cl.
*H04R 1/22* (2006.01)
*G10K 11/175* (2006.01)
*G06F 17/14* (2006.01)
*G10L 25/48* (2013.01)
*G10L 21/007* (2013.01)

(52) U.S. Cl.
CPC ........... *H04R 1/222* (2013.01); *G06F 17/142* (2013.01); *G10K 11/175* (2013.01); *G10L 21/007* (2013.01); *G10L 25/48* (2013.01)

(58) Field of Classification Search
None
See application file for complete search history.

(56) References Cited

U.S. PATENT DOCUMENTS 4,160,875 A * 7/1979 Kahn ................. G08B 13/1672
340/6.1
9,478,231 B1 * 10/2016 Soman .................. G06F 1/3206

OTHER PUBLICATIONS

"Analog wireless microphones vs. digital wireless." Shure, Aug. 29, 2017.*

* cited by examiner

*Primary Examiner* — James Mooney
(74) *Attorney, Agent, or Firm* — Jordan IP Law, LLC

(57) ABSTRACT

Systems, apparatuses and methods for secure audio acquisition. The method includes receiving audio data via a digital microphone. The digital microphone outputs a single bit at a high sampling rate. The digital microphone output is converted to a full range audio signal. The full range audio signal is filtered to provide a band limited audio output that avoids capture of enough of a spectral range of speech for the speech to be intelligible.

14 Claims, 9 Drawing Sheets

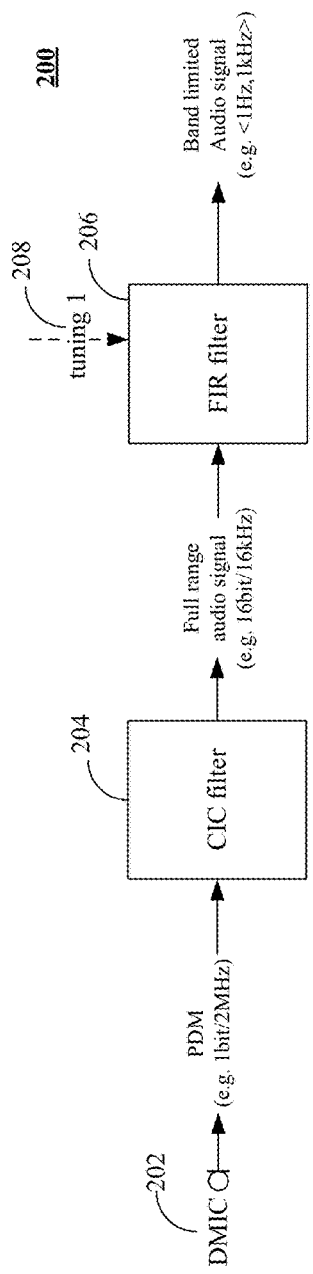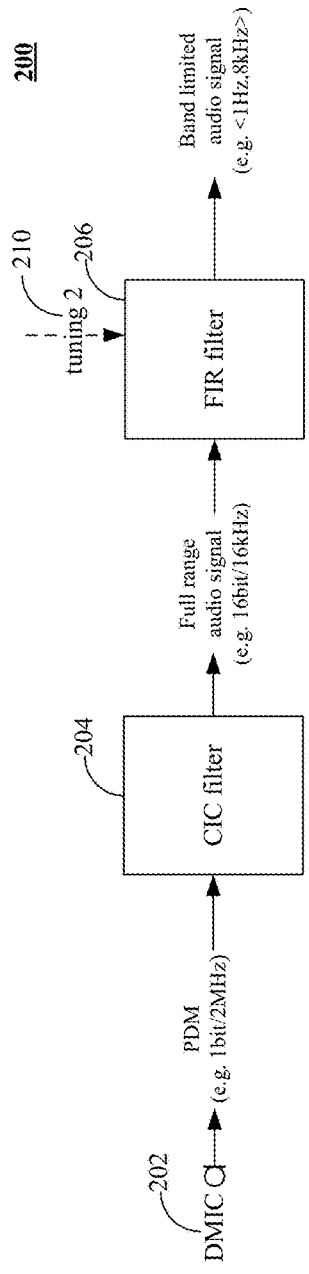
FIG. 2A
FIG. 2B

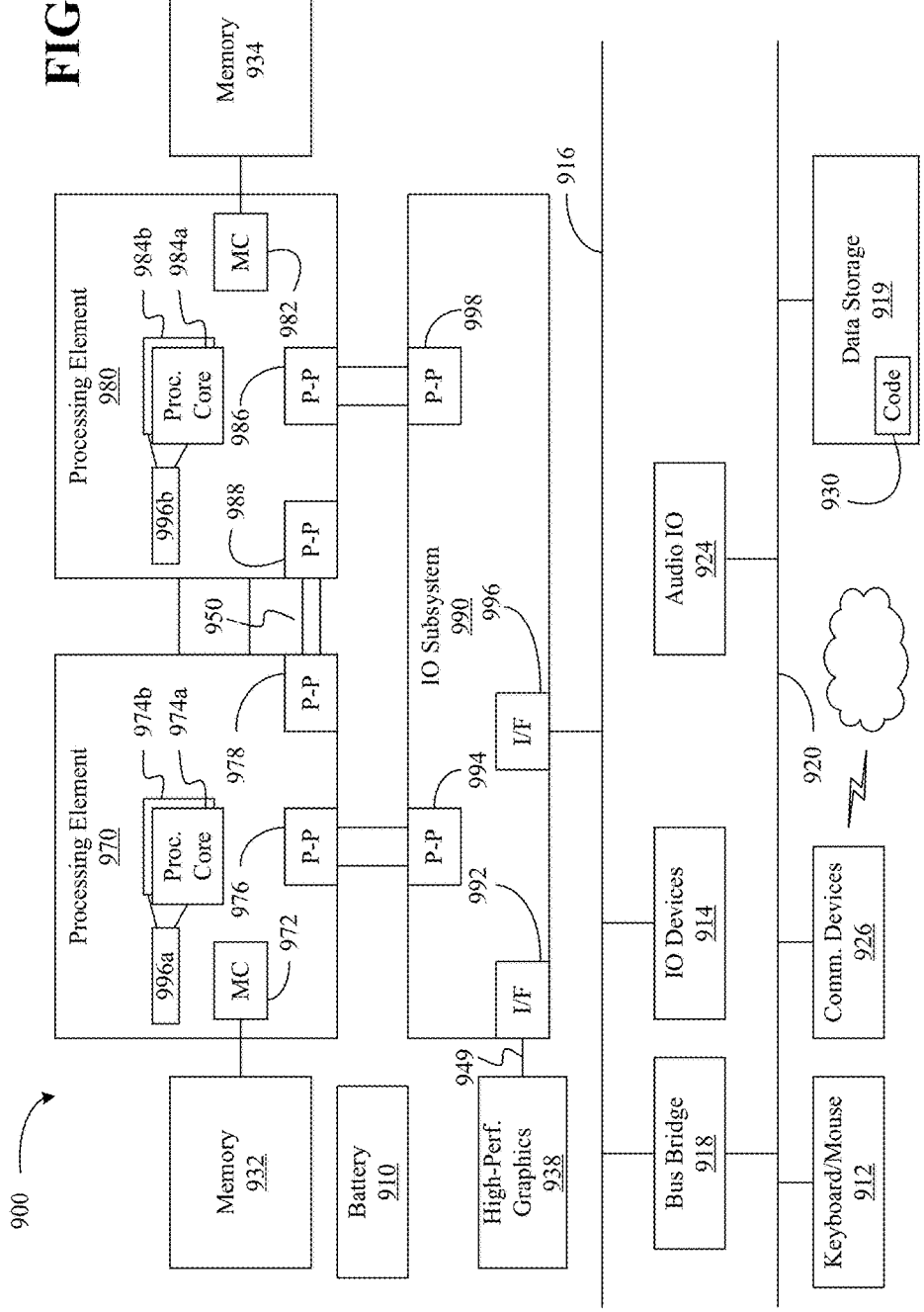

SECURE AUDIO ACQUISITION SYSTEM WITH LIMITED FREQUENCY RANGE FOR PRIVACY

TECHNICAL FIELD

Embodiments generally relate to a secure audio acquisition system. More particularly, embodiments relate to a secure audio acquisition system with the ability to limit the frequency range for privacy.

BACKGROUND

Audio acquisition systems used in the market for acoustic event detection, gait detection and recognition, etc., use microphones that are capable of capturing each and every acoustic event, including speech, within the frequency spectrum they are programmed to capture in, commonly in the range of 0-24 kHz. In many modern applications, these systems send the acquired audio data digitalized to the cloud for further analysis. A sensor whose job is to detect specific acoustic events, e.g., glass break or baby cry, will capture speech too, inherently by design. This is concerning for security and privacy reasons.

BRIEF DESCRIPTION OF THE DRAWINGS

The various advantages of the embodiments will become apparent to one skilled in the art by reading the following specification and appended claims, and by referencing the following drawings, in which:

FIGS. 2A and 2B are block diagrams illustrating example hardware implementations of audio acquisition systems that exclude and include certain frequency ranges according to an embodiment;

FIG. 9 is a block diagram of an exemplary computing system according to an embodiment.

Figure 1A:
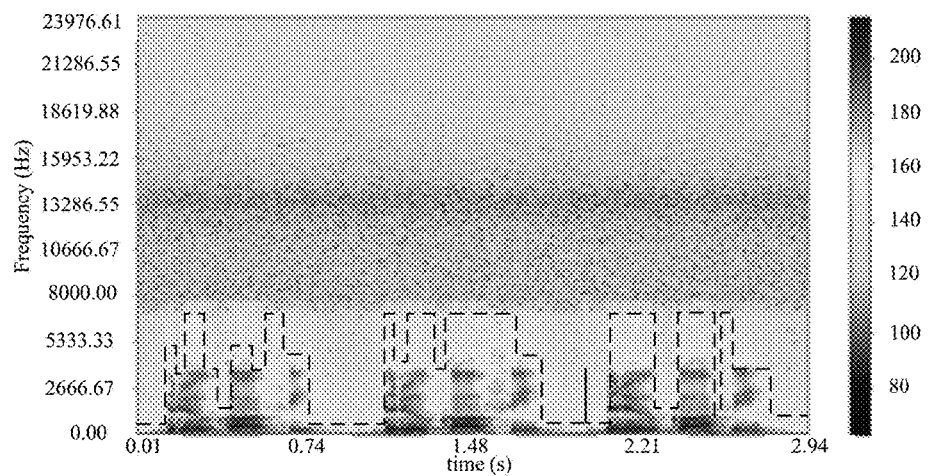
FIG. 1A is a diagram of an example spectrogram for an audio speech event.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to provide a secure audio acquisition system designed for acoustic event detection purposes other than speech acquisition, detection, and recognition. The secure audio acquisition system limits the audio signal frequency range of the captured audio and serves the operating system (OS) with an audio signal with limited frequency range to avoid speech acquisition. In other words, embodiments guarantee that the acquired audio signal cannot be used for understanding speech content unless the full-range of the frequency spectrum is desired to enable multi-purpose use. This is accomplished by applying tunable filters in the time domain and the frequency domain to limit the audio signal frequency range.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1A is a diagram of an example speech spectrogram. As shown in FIG. 1, the frequency range for speech is approximately 100 Hz to 8 kHz. The concentration of energy for speech is shown using a dotted line. To avoid speech acquisition during audio detection and recognition tasks such as, for example, acoustic event detection, the spectrograms for the acoustic events to be detected must show adequate energy levels in frequency ranges above 8 kHz and below 100 Hz or at the lower frequency end of the speech spectrogram where speech frequency components captured would be minimal, with inadequate information to reconstruct what is being said.

Figure 1B:
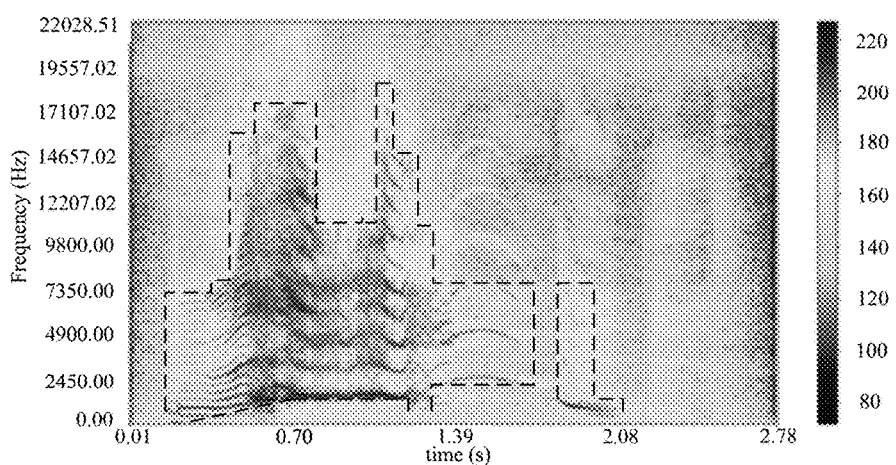
FIG. 1B is a diagram of an example spectrogram for a baby cry event.
Figure 1C:
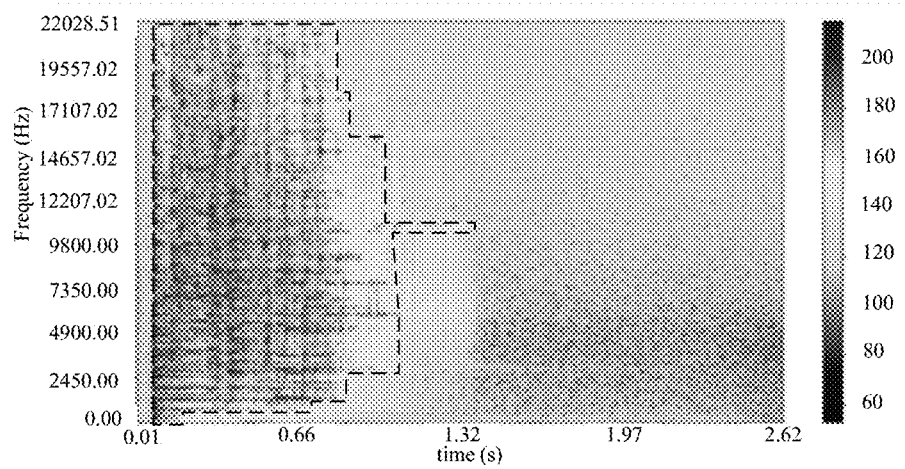
FIG. 1C is a diagram of an example spectrogram for a glass break event.
Figure 1D:
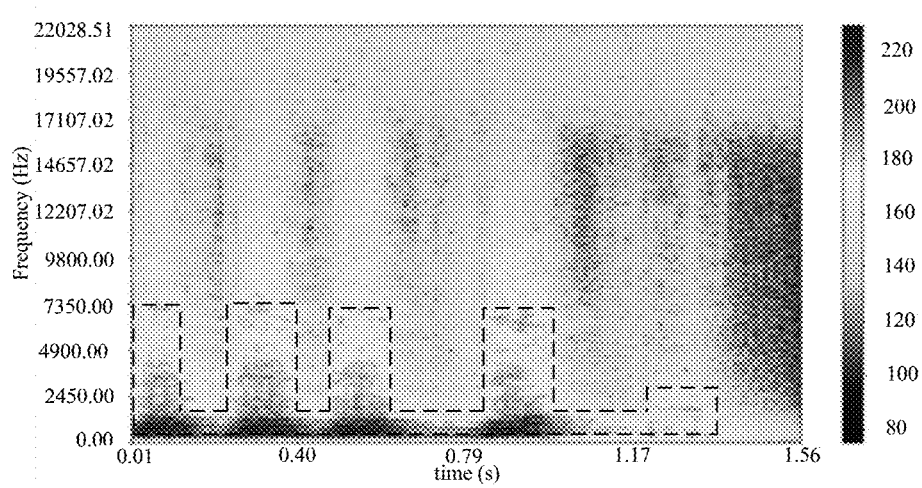
FIG. 1D is a diagram of an example spectrogram for a dog bark event.

Example acoustic events having spectrograms that may allow the acoustic events to be detected while avoiding speech detection are shown in FIGS. 1B, 1C, and 1D. FIG. 1B is a diagram of an example baby cry spectrogram. As can be seen in FIG. 1B, a baby cry event shows adequate energy levels at frequencies above the maximum speech frequency of 8 kHz to approximately 22 kHz. FIG. 1C is a diagram of an example glass break spectrogram. As can be seen in FIG. 1C, a glass break event also shows adequate energy levels at frequencies above the maximum speech frequency of 8 kHz to approximately 22 kHz. FIG. 1D is a diagram of an example dog bark spectrogram. In the case of a dog bark acoustic event, the majority of the energy resides in the lower end of the frequency spectrum up to approximately 1 kHz. The energy concentrated at the frequency band below 1 kHz may contain enough information to develop a dog bark detection and recognition engine because the speech components that would be captured at the same frequency band would not provide enough information for understanding the speech content of a conversation.

Embodiments include filters designed to exclude certain frequency ranges to avoid the speech spectrum, partially if not fully. Embodiments also enable the filters to acquire the full-range of the frequency spectrum on demand to enable multi-purpose use. That is, capturing speech only when needed, such as, for example, for a voice call, and eliminating speech detection otherwise. This is accomplished by band limiting the audio signal using tunable filters.

FIGS. 2A and 2B are block diagrams illustrating example hardware implemented audio acquisition systems that exclude and include certain frequency ranges according to an embodiment. Shown in FIG. 2A is an audio acquisition system 200 that excludes certain frequency ranges to avoid capturing audio content in the form of speech. System 200 includes a digital microphone (DMIC) 202, a Cascaded Integrator-Comb (CIC) filter 204 and a Finite Impulse Response (FIR) filter 206. The digital microphone 202 is coupled to the CIC filter 204, and the CIC filter 204 is coupled to the FIR filter 206.

The DMIC 202 may also be referred to as a Pulse Density Modulation (PDM) microphone. The DMIC 202 receives audio data, and includes a PDM modulator that enables it to output a single bit at a high sampling rate, such as, for example, 1 bit/2 MHz.

The CIC filter 204 efficiently performs decimation and interpolation. The CIC filter 204 receives the PDM signal from the DMIC 202 and converts the PDM signal to an audio signal range. In this instance, the CIC filter 204 converts the PDM signal to a full range audio signal of 16 bit/16 kHz.

The FIR filter 206 is a variable bandwidth filter that can be tuned to provide a band limited audio signal. The FIR filter 206 receives the full range audio signal from the CIC filter 204 and tunes the filter using parameters defined by tuning 1 (208) to trigger the always listening mode of the acquisition system 200 where speech is never captured. The band limited signal is provided to the operating system (OS) of a computing system for audio detection and recognition. Audio detection and recognition tasks may include, for example, acoustic event detection, such as, for example, a baby crying, glass breaking, gait detection, a dog barking, a gunshot, etc., where the speech range can be avoided and the accuracy performance of the detection/recognition of the events remains acceptable.

FIR filters may also be tuned by parameters that allow the system 200 to be used for speech acquisition purposes on demand. For example, if there is a voice call, FIR parameters may be changed so that the audio signal frequency range of the output signal is not limited, thereby enabling the system to capture speech and deliver it to the OS. FIG. 2B shows the audio acquisition system 200 including frequency ranges to capture audio content in the form of speech. FIG. 2B is similar to FIG. 2A, with the exception of the tuning parameters Tuning 2 (210) for FIR filter 206. In this instance, the FIR parameters 210 have been changed so that the audio signal frequency range of the output is not limited, thereby triggering the voice capture capability that may be useful when there is a voice call and the system 200 is required to capture speech, such as, for example, with a mobile phone or static smart speakers, such as, for example, Amazon Echo, developed by Amazon.com.

Figure 3A:
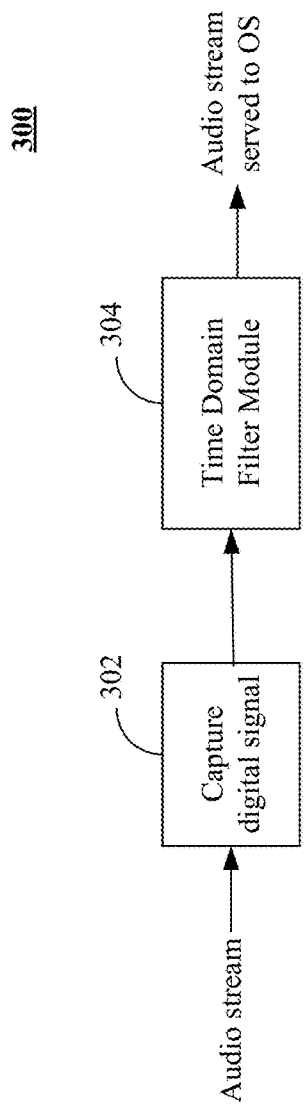
FIG. 3A is a block diagram illustrating an example firmware implementation of an audio acquisition system that incorporates time-domain filters to band limit the audio signal according to an embodiment.

Similar functionality as described in reference to FIGS. 2A and 2B may be achieved through firmware. FIG. 3A is a block diagram illustrating an example firmware implementation of an audio acquisition system 300 that incorporates time-domain filters to band limit the audio signal according to an embodiment. The system 300 includes a capture digital signal module 302 coupled to a time domain filter module 304. Although not explicitly shown in FIG. 3A, in an embodiment, the audio stream may be captured in a similar manner as that described in FIGS. 2A and 2B, which uses a digital microphone. The output of the digital microphone is then sent to the capture digital signal module 302. The capture digital signal module 302 may convert the digital signal to a full range audio signal.

The time domain filter module 304, after receiving the full range audio signal, may apply time-domain filters to remove certain frequency bands. For example, the time-domain filter module 304 may apply a low-pass filter to attenuate content above a cut-off frequency or a high-pass filter to attenuate content below a cut-off frequency. A bandpass filter may also be used to band limit the audio signal by only allowing signals between two specific frequencies ($f_1$ and $f_2$) to pass. After the audio signal has been band limited, the audio signal with limited frequency range to avoid speech acquisition is served to the OS for audio detection and recognition tasks.

Figure 3B:
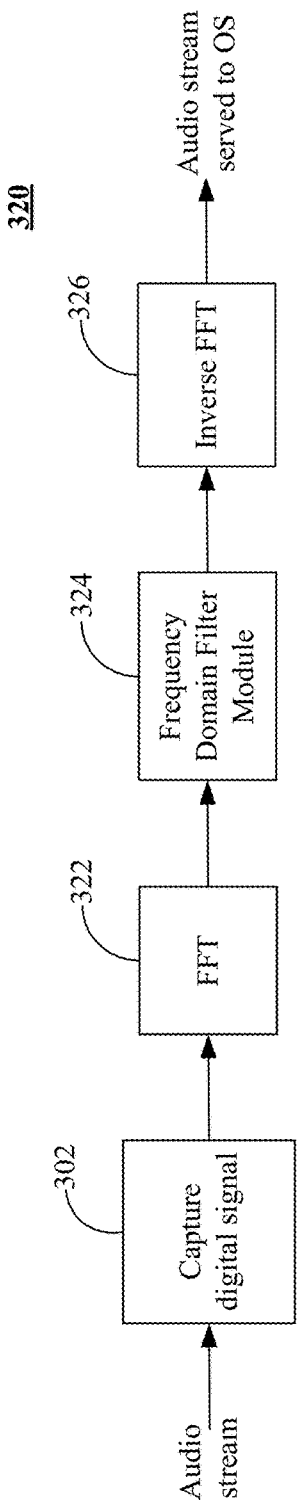
FIG. 3B is a block diagram illustrating an example firmware implementation of an audio acquisition system that incorporates frequency-domain filters to band limit the audio signal according to an embodiment.

FIG. 3B is a block diagram illustrating an example firmware implementation of an audio acquisition system 320 that incorporates frequency-domain filters to band limit the audio signal according to an embodiment. System 320 includes the capture digital signal module 302, a Fast Fourier Transform (FFT) module 322, a frequency band filter module 324 and an Inverse Fast Fourier Transform (FFT) module 326. The capture digital signal module 302 is coupled to the FFT module 322. The FFT module 322 is coupled to the frequency band filter module 324. The frequency band filter module 324 is coupled to the inverse FFT module 326.

The capture digital signal module 302 captures the incoming audio stream and converts it to a digital signal in the time domain. The FFT module 322 transforms the time domain signal into a frequency domain representation of the signal. This generates a description of the distribution of the energy in the signal as a function of the frequency. The frequency axis is divided into frequency bins and every frequency bin shows the total energy for that frequency bin.

The frequency band filter module 324 may be used to remove certain frequency bins in order to band limit the audio signal. The frequency band filter module 324 accomplishes this by zeroing out any undesired frequency bins. For example, if the initial five frequency bins are covering the speech range from 100 Hz to 8 kHz, then these bins may be eliminated if the intent is to avoid capturing speech. Alternatively, if there is a voice call, the audio signal frequency range of the output is not limited. In this instance, the frequency band filter module 324 will pass the full audio signal through without zeroing out any bins.

The inverse FFT module 326 receives the output from the frequency band filter module 324 and performs an inverse FFT to transform the signal back to the time domain. The output audio stream from the inverse FFT module 326 is served to the OS for audio detection and recognition tasks.

Figure 4:
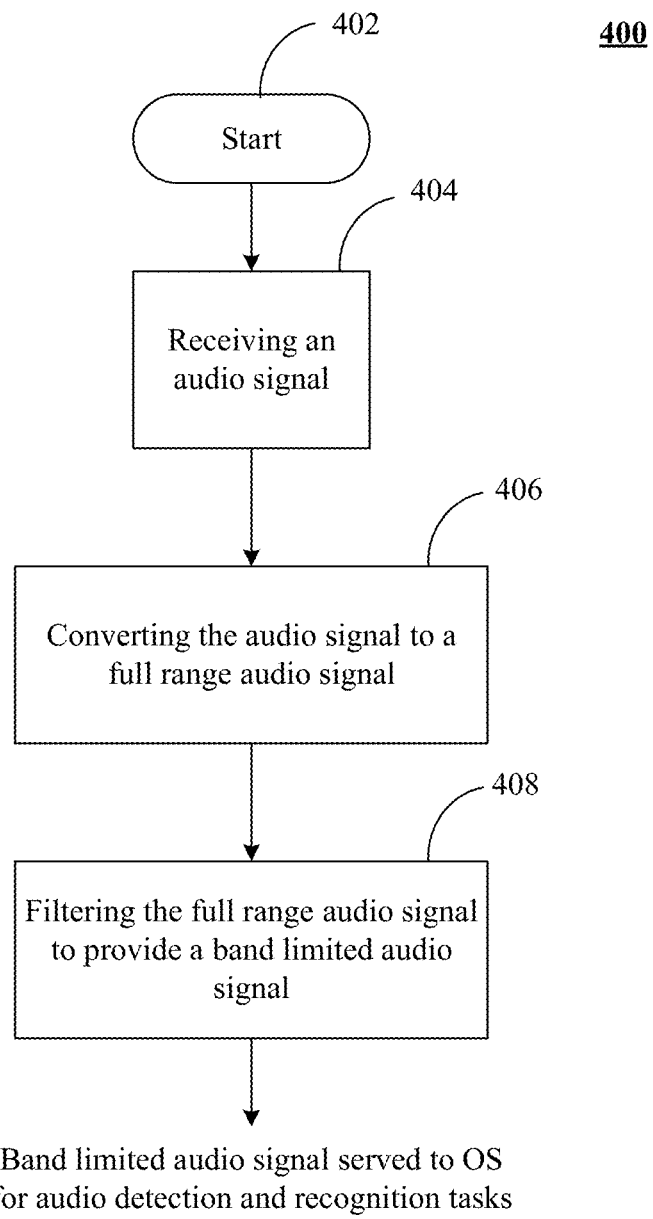
FIG. 4 is a flow diagram of an example method of limiting the audio signal frequency of captured audio according to an embodiment.

FIG. 4 is a flow diagram of an example method of limiting the audio signal frequency of captured audio according to an embodiment. The method 400 may generally be implemented in a system such as, for example, the audio acquisition system 200 as shown in FIGS. 2A and 2B. More particularly, the method 400 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 402 where the process immediately proceeds to block 404. In block 404, the audio acquisition system receives an audio stream of data. In one embodiment, the audio stream is received by a digital microphone (DMIC). The DMIC includes a Pulse Density Modulation (PDM) modulator that enables the DMIC to output a single bit at a high sampling rate. The process then proceeds to block 406.

In block 406, the digital audio output from the DMIC is converted to an audio signal range, such as, a full range audio signal. In one embodiment, a cascaded integrator-comb (CIC) filter is used to perform the conversion. The process then proceeds to block 408.

In block 408, the full range audio signal from block 406 is filtered. In one embodiment, a variable bandwidth filter that can be tuned to provide a band limited audio signal may be used. In one embodiment, the filter is a Finite Impulse Response (FIR) filter that tunes the signal using a set of first tuning parameters that trigger an always listening mode of the audio acquisition system 200 and band limits the audio signal to primarily avoid capture of the speech spectrum (100 Hz to 8 kHz) partially or fully. This enables an inherently secure system, never transferring content outside of the device that can be exploited to listen to conversations of people while in their homes or other private spaces. The band limited signal may then be served to an operating system (OS) of a computing system to perform secure audio detection and recognition tasks, such as, for example, acoustic event detection. The system may use machine learning algorithms to train the system to detect and recognize various acoustic events based on their event spectrograms. The machine learning algorithms may include, but are not limited to, a Deep Neural Network (DNN), a Convolutional Neural Network (CNN), a Support Vector Machine (SVM), and a Maximum Likelihood Recognizer (MLR).

In one embodiment, the audio acquisition system 200 enables multi-purpose use by employing tunable filters that allow the use of sensors to include or exclude certain frequency ranges. This is accomplished using the set of first tuning parameters to trigger the always listening mode to fully or partially exclude certain frequency ranges to avoid speech and a set of second tuning parameters to acquire full range of the frequency spectrum on demand. For example, if there is a voice call, the FIR tuning parameters may be changed from the always listening mode using the first set of tuning parameters to a voice capture mode using the second tuning parameters that allows the system to be used for speech acquisition purposes on demand.

In another embodiment, the full range audio signal may be filtered using time domain filters to band limit the signal. Time domain filters may include low pass filters, high pass filters, and bandpass filters. In embodiments, the time domain filters may be designed to exclude or include frequency ranges to enable multi-purpose use as described above. For example, a high pass filter with a cutoff frequency of 8 kHz may be used to to pass frequencies higher than 8 kHz to avoid the capture of speech while a bandpass filter having $f_1$ set to 100 Hz and $f_2$ set to 8 kHz may be used to pass frequencies between 100 Hz and 8 kHz to capture speech.

In yet another embodiment, the full range audio signal may be converted from a time domain signal to a frequency domain signal to allow frequency domain filtering to band limit the audio signal. In such an embodiment, the time domain audio signal is converted to a frequency domain signal using a FFT (Fast Fourier Transform). The signal is then filtered in the frequency domain by eliminating undesired frequency bins. For example, undesired frequency bins may be frequency bins that contain speech signals when avoiding speech. If the system is to be used to capture voice calls on demand, then in this instance, the undesired frequency bins are the frequencies that lie outside of the those that carry speech signals. After the audio signal is filtered, an Inverse FFT is performed to convert the signal back to the time domain. The time domain audio signal is then served to the OS to perform secure audio detection and recognition tasks, such as, for example, acoustic event detection.

Thus, embodiments address privacy concerns by capturing audio events with band limited frequency components in order to fully or partially avoid the speech frequency range. This can be applied to a plurality of fields for many different uses. One such field and use is the medical field where specific physiological sounds are detected and monitored. For example, one such use may be the detection of a chronic cough in a patient over an extended period of time where the number of times the patient coughs is counted and monitored.

A Leicester Cough Monitor (LCM) used to assess 24 hour cough frequency in patients with chronic cough conditions is presented in S. S. Birring et al., *The Leicester Cough Monitor: preliminary validation of an automated cough detection system in chronic cough*, European Respiratory Journal 2008. The approach used by the LCM collects the audio data in full frequency range without limiting it to a non-speech range. It uses Hidden Markov Models to detect coughs via a keyword-spotting algorithm defined in speech recognition. The LCM device captures all sound and could be used to listen to recorded conversations from the LCM user that occurred during the monitoring period. Embodiments described herein could be implemented in the LCM to avoid the capture of speech during the cough monitoring period.

Figure 5A:
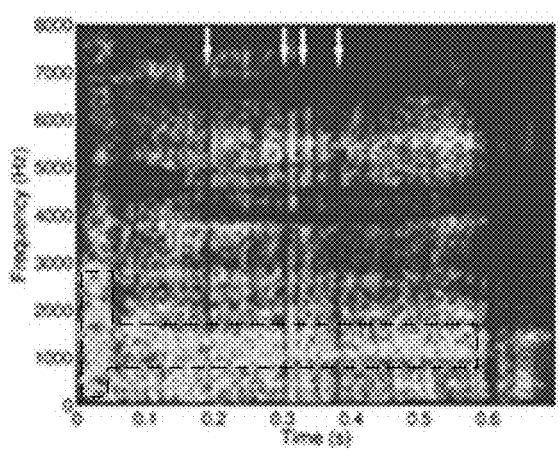
FIG. 5A is a diagram illustrating an example spectrogram of a cough.
Figure 5B:
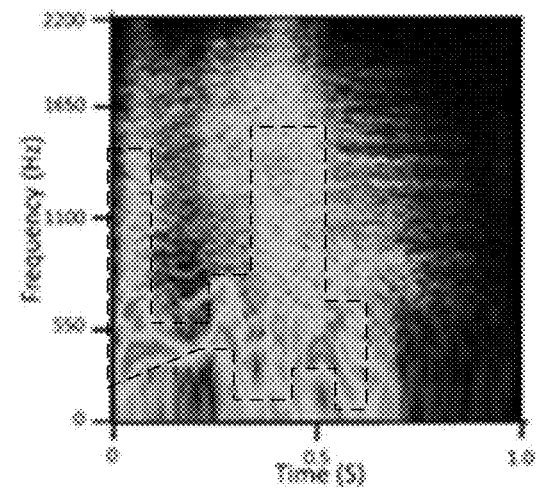
FIG. 5B is a diagram illustrating an example spectrogram of a sneeze.
Figure 5C:
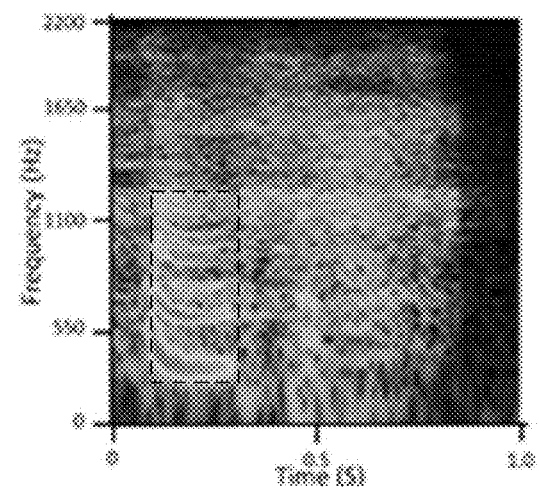
FIG. 5C is a diagram illustrating an example spectrogram of cleaning a runny nose.

FIG. 5A is a diagram illustrating an example spectrogram of a cough. As shown in the cough spectrogram, useful audio information in the frequencies below 3 kHz exists. Tuning the filters described above to trigger the always listening mode of the audio acquisition system 200 to avoid capturing speech (as shown, for example, in FIG. 2A) customizes the system to capture only the desired cough frequency bands without capturing enough speech frequency component information to reconstruct speech, thereby avoiding any privacy concerns that may arise for the users. To detect and recognize the cough sounds, a pre-trained machine learning algorithm, such as, but not limited to, a Deep Neural Network (DNN), a Convolutional Neural Network (CNN), a Support Vector Machine (SVM), a Maximum Likelihood Recognizer (MLR), etc., may be used. Smart physiological acoustic monitors could be implemented to detect other acoustic reflexes from patients. For example, the progress of a certain disease or allergy may be tracked by monitoring the frequency of a sneeze sound. This is accomplished by tuning the filters described in embodiments herein to detect the frequencies contained below 800 Hz (see FIG. 5B showing an example spectrogram of a sneeze). A similar approach may be implemented for the sound of cleaning a runny nose where the frequency components are in the form of wheezes between 50-1500 Hz (see FIG. 5C showing an example spectrogram of cleaning a runny nose).

Although use cases in the medical field for detecting such events as coughing, sneezing, and running nose have been described, there are a plethora of events in numerous fields that may be securely detected and monitored without recording speech using embodiments described herein.

Figure 6:
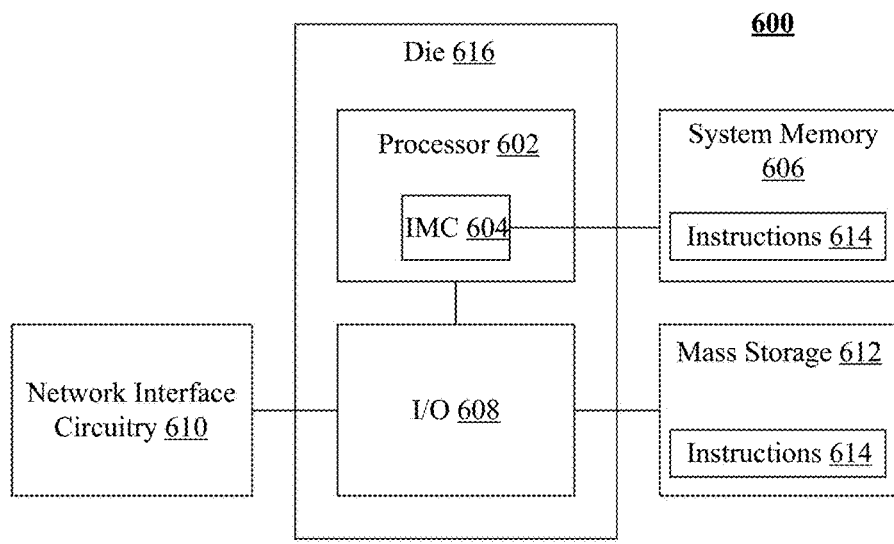
FIG. 6 is a block diagram of an example of an audio gait detection and identification/verification system according to an embodiment.

FIG. 6 shows a system 600 that may be readily substituted for the audio acquisition systems shown above with reference to FIGS. 2A, 2B, 3A, and 3B. The illustrated system 600 includes a processor 602 (e.g., host processor, central processing unit/CPU) having an integrated memory controller (IMC) 604 coupled to a system memory 606 (e.g., volatile memory, dynamic random access memory/DRAM). The processor 602 may also be coupled to an input/output (I/O) module 608 that communicates with network interface circuitry 610 (e.g., network controller, network interface card/NIC) and mass storage 612 (non-volatile memory/NVM, hard disk drive/HDD, optical disk, solid state disk/SSD, flash memory). The network interface circuitry 610 may receive audio data from a digital microphone such as, for example, DMIC 202 (shown in FIGS. 2A and 2B), wherein the system memory 606 and/or the mass storage 612 may be memory devices that store instructions 614, which when executed by the processor 602, cause the system 600 to perform one or more aspects of the method 400 (FIG. 4), already discussed. Thus, execution of the instructions 614 may cause the system 600 to receive audio data via a digital microphone, the digital microphone to output a single bit at a high sampling rate; convert the digital microphone output to a full range audio signal; filter the full range audio signal to provide a band limited audio output that enables privacy of speech by avoiding the capture of speech; and serve the band limited audio signal to an operating system (OS) for acoustic event detection and recognition. The processor 602 and the IO module 608 may be incorporated into a shared die 616 as a system on chip (SoC).

Figure 7:
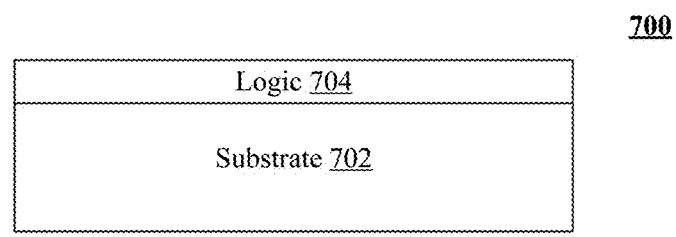
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 400 (FIG. 4), already discussed.

Figure 8:
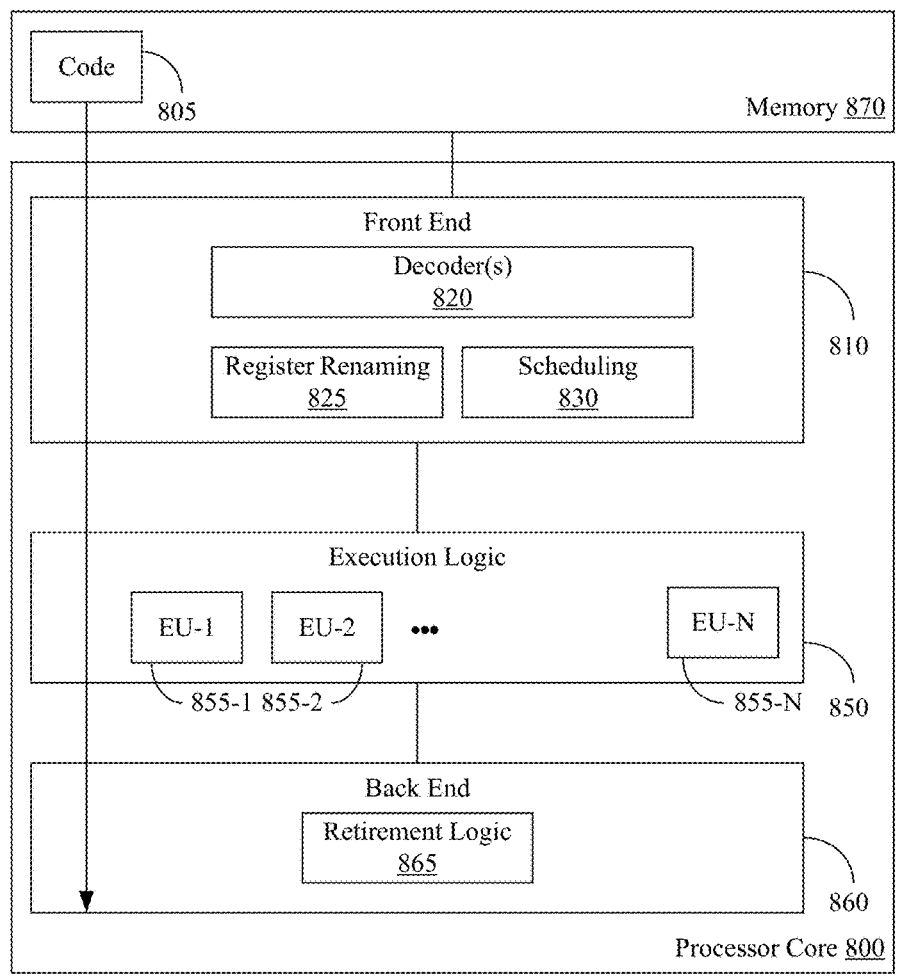
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 400 (FIG. 4), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974*a* and 974*b* and processor cores 984*a* and 984*b*). Such cores 974*a*, 974*b*, 984*a*, 984*b* may be configured to execute instruction code in a manner similar to that discussed above in connection with FIG. 8.

Each processing element 970, 980 may include at least one shared cache 996*a*, 996*b*. The shared cache 996*a*, 996*b* may store data (e.g., instructions) that are utilized by one or more components of the processor, such as the cores 974*a*, 974*b* and 984*a*, 984*b*, respectively. For example, the shared cache 996*a*, 996*b* may locally cache data stored in a memory 932, 934 for faster access by components of the processor. In one or more embodiments, the shared cache 996*a*, 996*b* may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the method 400 (FIG. 4), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a secure audio acquisition system comprising network interface circuitry to receive audio data from a digital microphone, a processor coupled to the network interface circuitry, one or more memory devices coupled to the processor, the one or more memory devices including instructions, which when executed by the processor, cause the system to convert the audio data to a full range audio signal, and filter the full range audio signal to provide a band limited audio output that avoids capture of speech.

Example 2 may include the secure audio acquisition system of Example 1, wherein the instructions, when executed, further cause the system to serve the band limited audio output to an operating system (OS) for acoustic event detection and recognition.

Example 3 may include the secure audio acquisition system of Example 2, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 4 may include the secure audio acquisition system of Example 1, wherein instructions to filter the full range audio signal comprises instructions to filter the full range audio signal using a variable bandwidth filter having a tuning input, the instructions, which when executed, further cause the system to tune the variable bandwidth filter using parameters that band limit the full range audio signal to trigger an always listening mode providing privacy of speech by avoiding capture of enough of a spectral range of speech for the speech to be intelligible.

Example 5 may include the secure audio acquisition system of Example 1, wherein instructions to filter the full range audio signal comprises instructions to filter the full range audio signal using a variable bandwidth filter having a tuning input, the instructions, which when executed, further cause the system to tune the variable bandwidth filter using a first set of parameters to include or exclude frequency ranges to avoid a speech spectrum of 100 Hz to 8 kHz partially or fully, and if a voice call is received, tune the variable bandwidth filter using a second set of parameters to acquire full range of the frequency spectrum on demand to enable multi-purpose use, wherein the first set of parameters triggers an always listening mode where intelligible speech is never captured and the second set of parameters triggers a voice capture capability mode.

Example 6 may include the secure audio acquisition system of Example 1, wherein instructions to filter the full range audio signal comprises instructions to filter the full range audio signal using time domain filters to band limit the full range audio signal, wherein time domain filters include one or more of a low pass filter, a high pass filter, and a bandpass filter.

Example 7 may include the secure audio acquisition system of Example 1, wherein instructions to filter the full range audio signal comprises instructions to filter the full range audio signal using frequency domain filtering to band limit the full range audio signal, the instructions, which when executed, further cause the system to convert the full range audio signal from a time domain to a frequency domain using a fast fourier transform (FFT) to obtain a frequency domain audio signal having a plurality of frequency bins, filter the frequency domain audio signal to obtain a filtered frequency domain audio signal by eliminating undesired frequency bins, wherein eliminating the undesired frequency bins includes instructions to zero out the undesired frequency bins, and convert the filtered frequency domain audio signal from the frequency domain to the time domain using an inverse fast fourier transform (Inverse FFT) to obtain a band limited time domain audio signal.

Example 8 may include the secure audio acquisition system of Example 1, wherein the digital microphone includes a pulse density modulation (PDM) modulator to enable the digital microphone to output single bits at high sampling rates.

Example 9 may include the secure audio acquisition system of Example 1, wherein a cascaded integrator-comb (CIC) filter converts the digital microphone output to the full range audio signal, wherein instructions to convert the audio data comprises instructions to perform decimation and interpolation.

Example 10 may include the secure audio acquisition system of Example 1, wherein a variable bandwidth filter filters the full range audio signal to provide the band limited audio output, the variable bandwidth filter comprising a Finite Impulse Response (FIR) filter, wherein instructions to filter the full range audio signal comprise instructions to tune the variable bandwidth filter using parameters that band limit the full range audio signal.

Example 11 may include an apparatus comprising one or more substrates, and logic coupled to the one or more substrates, wherein the logic includes one or more of configurable logic or fixed-functionality hardware logic, the logic coupled to the one or more substrates to receive audio data via a digital microphone, convert the audio data to a full range audio signal, and filter the full range audio signal to provide a band limited audio output that avoids capture of speech.

Example 12 may include the apparatus of Example 11, wherein the logic coupled to the one or more substrates to further serve the band limited audio output to an operating system (OS) for acoustic event detection and recognition.

Example 13 may include the apparatus of Example 12, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 14 may include the apparatus of Example 11, wherein the logic coupled to the one or more substrates to filter the full range audio signal includes logic to filter the full range audio signal using a variable bandwidth filter having a tuning input, the logic coupled to the one or more substrates further to tune the variable bandwidth filter using parameters that band limit the full range audio signal to trigger an always listening mode providing privacy of speech by avoiding capture of enough of a spectral range of speech for the speech to be intelligible.

Example 15 may include the apparatus of Example 11, wherein the logic coupled to the one or more substrates to filter the full range audio signal includes logic to filter the full range audio signal using a variable bandwidth filter having a tuning input, the logic coupled to the one or more substrates further to tune the variable bandwidth filter using a first set of parameters to include or exclude frequency ranges to avoid a speech spectrum of 100 Hz to 8 kHz partially or fully, and if a voice call is received, tune the variable bandwidth filter using a second set of parameters to acquire full range of the frequency spectrum on demand to enable multi-purpose use, wherein the first set of parameters triggers an always listening mode where intelligible speech is never captured and the second set of parameters triggers a voice capture capability mode.

Example 16 may include the apparatus of Example 11, wherein the logic coupled to the one or more substrates to filter the full range audio signal includes logic to filter the full range audio signal using time domain filters to band limit the full range audio signal, wherein time domain filters include one or more of a low pass filter, a high pass filter, and a bandpass filter.

Example 17 may include the apparatus of Example 11, wherein the logic coupled to the one or more substrates to filter the full range audio signal includes logic to filter the full range audio signal using frequency domain filtering to band limit the full range audio signal, the logic coupled to the one or more substrates further to convert the full range audio signal from a time domain to a frequency domain using a fast fourier transform (FFT) to obtain a frequency domain audio signal having a plurality of frequency bins, filter the frequency domain audio signal to obtain a filtered frequency domain audio signal by eliminating undesired frequency bins, wherein eliminating the undesired frequency bins includes instructions to zero out the undesired frequency bins, and convert the filtered frequency domain audio signal from the frequency domain to the time domain using an inverse fast fourier transform (Inverse FFT) to obtain a band limited time domain audio signal.

Example 18 may include a method of secure audio acquisition, comprising receiving audio data via a digital microphone, converting the audio data to a full range audio signal, and filtering the full range audio signal to provide a band limited audio output that avoids capture of speech.

Example 19 may include the method of Example 18, further comprising serving the band limited audio output to an operating system (OS) of a computing system for acoustic event detection and recognition.

Example 20 may include the method of Example 19, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 21 may include the method of Example 18, wherein filtering the full range audio signal comprises filtering the full range audio signal using a variable bandwidth filter having a tuning input, the method further comprising tuning the variable bandwidth filter using parameters that band limit the full range audio signal to trigger an always listening mode providing privacy of speech by avoiding capture of enough of a spectral range of speech for the speech to be intelligible.

Example 22 may include the method of Example 18, wherein filtering the full range audio signal comprises filtering the full range audio signal using a variable bandwidth filter having a tuning input, the method further comprising tuning the variable bandwidth filter using a first set of parameters to include or exclude frequency ranges to avoid a speech spectrum of 100 Hz to 8 kHz partially or fully, and if a voice call is received, tuning the variable bandwidth filter using a second set of parameters to acquire full range of the frequency spectrum on demand to enable multi-purpose use, wherein the first set of parameters triggers an always listening mode where intelligible speech is never captured and the second set of parameters triggers a voice capture capability mode.

Example 23 may include the method of Example 18, wherein filtering the full range audio signal comprises filtering the full range audio signal using time domain filters to band limit the full range audio signal, wherein time domain filters include one or more of a low pass filter, a high pass filter, and a bandpass filter.

Example 24 may include the method of Example 18, wherein filtering the full range audio signal comprises filtering the full range audio signal using frequency domain filtering to band limit the full range audio signal, the method further comprising converting the full range audio signal from a time domain to a frequency domain using a fast fourier transform (FFT) to obtain a frequency domain audio signal having a plurality of frequency bins, filtering the frequency domain audio signal to obtain a filtered frequency domain audio signal by eliminating undesired frequency bins, wherein eliminating the undesired frequency bins comprises zeroing out the undesired frequency bins, and converting the filtered frequency domain audio signal from the frequency domain to the time domain using an inverse fast fourier transform (Inverse FFT) to obtain a band limited time domain audio signal.

Example 25 may include at least one computer readable medium, comprising a set of instructions, which when executed by a computing device, cause the computing device to receive audio data via a digital microphone, convert the audio data to a full range audio signal, and filter the full range audio signal to provide a band limited audio output that avoids capture of speech.

Example 26 may include the at least one computer readable medium of Example 25, comprising further instructions, which when executed by the computing device, cause the computing device to serve the band limited audio output to an operating system (OS) of a computing system for acoustic event detection and recognition.

Example 27 may include the at least one computer readable medium of Example 26, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 28 may include the at least one computer readable medium of Example 25, wherein instructions to filter the full range audio signal comprises instructions to filter the full range audio signal using a variable bandwidth filter having a tuning input, the instructions, which when executed by the computing device, further cause the computing device to tune the variable bandwidth filter using parameters that band limit the full range audio signal to trigger an always listening mode providing privacy of speech by avoiding capture of enough of a spectral range of speech for the speech to be intelligible.

Example 29 may include the at least one computer readable medium of Example 25, wherein instructions to filter the full range audio signal comprises instructions to filter the full range audio signal using a variable bandwidth filter having a tuning input, the instructions, which when executed by the computing device, further cause the computing device to tune the variable bandwidth filter using a first set of parameters to include or exclude frequency ranges to avoid a speech spectrum of 100 Hz to 8 kHz partially or fully, and if a voice call is received, tune the variable bandwidth filter using a second set of parameters to acquire full range of the frequency spectrum on demand to enable multi-purpose use, wherein the first set of parameters triggers an always listening mode where intelligible speech is never captured and the second set of parameters triggers a voice capture capability mode.

Example 30 may include the at least one computer readable medium of Example 25, wherein instructions to filter the full range audio signal comprises instructions to filter the full range audio signal using time domain filters to band limit the full range audio signal, wherein time domain filters include one or more of a low pass filter, a high pass filter, and a bandpass filter.

Example 31 may include the at least one computer readable medium of Example 25, wherein instructions to filter the full range audio signal comprises instructions to filter the full range audio signal using frequency domain filtering to band limit the full range audio signal, the instructions, which when executed by the computing device, further cause the computing device to convert the full range audio signal from a time domain to a frequency domain using a fast fourier transform (FFT) to obtain a frequency domain audio signal having a plurality of frequency bins, filter the frequency domain audio signal to obtain a filtered frequency domain audio signal by eliminating undesired frequency bins, wherein eliminating the undesired frequency bins includes instructions to zero out the undesired frequency bins, and convert the filtered frequency domain audio signal from the frequency domain to the time domain using an inverse fast fourier transform (Inverse FFT) to obtain a band limited time domain audio signal.

Example 32 may include a secure audio acquisition system, comprising a digital microphone to receive audio data, a filter to convert the audio data to a full range audio signal, and a variable bandwidth filter to band limit the full range audio signal to obtain a band limited audio output that avoids capture of speech.

Example 33 may include the system of Example 32, wherein the band limited audio output is served to an operating system (OS) of a computing system for acoustic event detection and recognition.

Example 34 may include the system of Example 33, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 35 may include the system of Example 32, wherein the digital microphone includes a pulse density modulation (PDM) modulator to enable the digital microphone to output single bits at high sampling rates.

Example 36 may include the system of Example 32, wherein the filter to convert the audio data to the full range audio signal comprises a cascaded integrator-comb (CIC) filter, wherein the CIC filter to perform decimation and interpolation.

Example 37 may include the system of Example 32, wherein the variable bandwidth filter comprises a Finite Impulse Response (FIR) filter, wherein the FIR filter includes a tuning signal to tune the variable bandwidth filter using parameters that band limit the full range audio signal.

Example 38 may include the system of Example 37, wherein the tuning signal comprises parameters that band limit the full range audio signal to trigger an always listening mode to provide privacy of speech by avoiding capture of enough of a spectral range of speech for the speech to be intelligible.

Example 39 may include the system of Example 37, wherein the tuning signal comprises a first set of parameters to include or exclude frequency ranges to avoid a speech spectrum of 100 Hz to 8 kHz partially or fully and a second set of parameters to acquire full range of the frequency spectrum on demand to enable multi-purpose use, wherein the first set of parameters trigger an always listening mode where intelligible speech is never captured and the second set of parameters trigger a voice capture capability mode when a voice call is received.

Example 40 may include an apparatus for a secure audio acquisition comprising means for receiving audio data via a digital microphone, means for converting the audio data to a full range audio signal, and means for filtering the full range audio signal to provide a band limited audio output that avoids capture of speech.

Example 41 may include the apparatus of Example 40, further comprising means for serving the band limited audio output to an operating system (OS) of a computing system for acoustic event detection and recognition.

Example 42 may include the apparatus of Example 41, wherein to avoid speech acquisition during the acoustic event detection and recognition, the band limited audio output of an acoustic event to exclude one of a speech spectrum of 100 Hz to 8 kHz or a spectrum from which speech can be reconstructed.

Example 43 may include the apparatus of Example 40, wherein means for filtering the full range audio signal comprises means for filtering the full range audio signal using a variable bandwidth filter having a tuning input, the apparatus further comprising means for tuning the variable bandwidth filter using parameters that band limit the full range audio signal to trigger an always listening mode providing privacy of speech by avoiding capture of enough of a spectral range of speech for the speech to be intelligible.

Example 44 may include the apparatus of Example 40, wherein means for filtering the full range audio signal comprises means for filtering the full range audio signal using a variable bandwidth filter having a tuning input, the apparatus further comprising means for tuning the variable bandwidth filter using a first set of parameters to include or exclude frequency ranges to avoid a speech spectrum of 100 Hz to 8 kHz partially or fully, and if a voice call is received, means for tuning the variable bandwidth filter using a second set of parameters to acquire full range of the frequency spectrum on demand to enable multi-purpose use, wherein the first set of parameters triggers an always listening mode where intelligible speech is never captured and the second set of parameters triggers a voice capture capability mode.

Example 45 may include the apparatus of Example 40, wherein means for filtering the full range audio signal comprises means for filtering the full range audio signal using time domain filters to band limit the full range audio signal, wherein time domain filters include one or more of a low pass filter, a high pass filter, and a bandpass filter.

Example 46 may include the apparatus of Example 40, wherein means for filtering the full range audio signal comprises means for filtering the full range audio signal using frequency domain filtering to band limit the full range audio signal, the apparatus further comprising means for converting the full range audio signal from a time domain to a frequency domain using a fast fourier transform (FFT) to obtain a frequency domain audio signal having a plurality of frequency bins, means for filtering the frequency domain audio signal by eliminating undesired frequency bins, wherein eliminating the undesired frequency bins comprises zeroing out the undesired frequency bins, and means for converting the filtered frequency domain audio signal from the frequency domain to the time domain using an inverse fast fourier transform (Inverse FFT) to obtain a band limited time domain audio signal.

Example 47 may include at least one computer readable medium comprising a set of instructions, which when executed by a computing system, cause the computing system to perform the method of any one of Examples 18 to 24.

Example 48 may include an apparatus comprising means for performing the method of any one of Examples 18 to 24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A secure audio acquisition system comprising:
   network interface circuitry to receive audio data from a digital microphone;
   a processor coupled to the network interface circuitry;
   one or more memory devices coupled to the processor, the one or more memory devices including instructions, which when executed by the processor, cause the system to:
   convert the audio data to a full range audio signal; and
   filter the full range audio signal using a variable bandwidth filter having a tuning input to tune the variable bandwidth filter using a first set of parameters to include or exclude frequency ranges to avoid a speech spectrum of 100 Hz to 8 kHz partially or fully to provide a band limited audio output that avoids capture of speech; and
   if a voice call is received, tune the variable bandwidth filter using a second set of parameters to acquire full range of the speech spectrum on demand to enable multi-purpose use.

2. The secure audio acquisition system of claim 1, wherein the instructions, when executed, further cause the system to serve the band limited audio output to an operating system (OS) for acoustic event detection and recognition.

3. The secure audio acquisition system of claim 1, wherein instructions to filter the full range audio signal use the variable bandwidth filter having the tuning input, which when executed, further cause the system to tune the variable bandwidth filter using parameters that band limit the full range audio signal to trigger an always listening mode providing privacy of speech by avoiding capture of enough of a spectral range of speech for the speech to be intelligible.

4. The secure audio acquisition system of claim 1, wherein the first set of parameters triggers an always listening mode where intelligible speech is never captured and the second set of parameters triggers a voice capture capability mode to capture the speech.

5. The secure audio acquisition system of claim 1, wherein the instructions to filter the full range audio signal comprises instructions to filter the full range audio signal using time domain filters to band limit the full range audio signal, wherein the time domain filters include one or more of a low pass filter, a high pass filter, and a bandpass filter.

6. An apparatus comprising:
   one or more substrates; and
   logic coupled to the one or more substrates, wherein the logic includes one or more of configurable logic or fixed-functionality hardware logic, the logic coupled to the one or more substrates to:
   receive audio data via a digital microphone;
   convert the audio data to a full range audio signal; and
   filter the full range audio signal using frequency domain filtering to band limit the full range audio signal to provide a band limited audio output that avoids capture of speech, wherein the logic coupled to the one or more substrates to convert the full range audio signal from a time domain to a frequency domain using a fast fourier transform (FFT) to obtain a frequency domain audio signal having a plurality of frequency bins; filter the frequency domain audio signal to obtain a filtered frequency domain audio signal by eliminating undesired frequency bins, wherein eliminating the undesired frequency bins includes instructions to zero out the undesired frequency bins; and convert the filtered frequency domain audio signal from the frequency domain to the time domain using an inverse fast fourier transform (Inverse FFT) to obtain a band limited time domain audio output signal.

7. The apparatus of claim 6, wherein the logic coupled to the one or more substrates to further serve the band limited time domain audio output signal to an operating system (OS) for acoustic event detection and recognition.

8. A method of secure audio acquisition, comprising:
receiving audio data via a digital microphone;
converting the audio data to a full range audio signal; and
filtering the full range audio signal using frequency domain filtering to band limit the full range audio signal to provide a band limited audio output that avoids capture of speech, wherein frequency domain filtering includes converting the full range audio signal from a time domain to a frequency domain using a fast fourier transform (FFT) to obtain a frequency domain audio signal having a plurality of frequency bins; filtering the frequency domain audio signal to obtain a filtered frequency domain audio signal by eliminating undesired frequency bins, wherein eliminating the undesired frequency bins comprises zeroing out the undesired frequency bins; and converting the filtered frequency domain audio signal from the frequency domain to the time domain using an inverse fast fourier transform (Inverse FFT) to obtain a band limited time domain audio output signal.

9. The method of claim 8, further comprising serving the band limited time domain audio output signal to an operating system (OS) of a computing system for acoustic event detection and recognition.

10. The method of claim 9, wherein to avoid speech acquisition during the acoustic event detection and recognition, the band limited time domain audio output signal of an acoustic event to exclude one of a speech spectrum of 100 Hz to 8 kHz or a spectrum from which speech can be reconstructed.

11. At least one non-transitory computer readable medium, comprising a set of instructions, which when executed by a computing device, cause the computing device to:
receive audio data via a digital microphone;
convert the audio data to a full range audio signal;
filter the full range audio signal using a variable bandwidth filter having a tuning input to tune the variable bandwidth filter using a first set of parameters to include or exclude frequency ranges to avoid a speech spectrum of 100 Hz to 8 kHz partially or fully to provide a band limited audio output that avoids capture of speech; and
if a voice call is received, tune the variable bandwidth filter using a second set of parameters to acquire full range of the speech spectrum on demand to enable multi-purpose use.

12. The at least one non-transitory computer readable medium of claim 11, comprising further instructions, which when executed by the computing device, cause the computing device to serve the band limited audio output to an operating system (OS) of a computing system for acoustic event detection and recognition.

13. The at least non-transitory one computer readable medium of claim 11,
wherein the first set of parameters triggers an always listening mode where intelligible speech is never captured and the second set of parameters triggers a voice capture capability mode to capture the speech.

14. The at least one non-transitory computer readable medium of claim 11, wherein the instructions to filter the full range audio signal comprises instructions to filter the full range audio signal using time domain filters to band limit the full range audio signal, wherein the time domain filters include one or more of a low pass filter, a high pass filter, and a bandpass filter.

* * * * *